United States Patent [19]

Melendres et al.

[11] 4,130,500

[45] Dec. 19, 1978

[54] LITHIUM-ALUMINUM-MAGNESIUM ELECTRODE COMPOSITION

[75] Inventors: Carlos A. Melendres, Bolingbrook; Stanley Siegel, Downers Grove, both of Ill.

[73] Assignee: The United States of America as represented by the United States Department of Energy, Washington, D.C.

[21] Appl. No.: 860,655

[22] Filed: Dec. 14, 1977

[51] Int. Cl.$^2$ .................. H01M 4/40; H01M 4/46
[52] U.S. Cl. .................. 252/182.1; 75/147; 75/168 B; 429/103; 429/188; 429/218
[58] Field of Search .................. 252/182.1; 429/103, 429/188, 218; 75/147, 168 B

[56] References Cited

U.S. PATENT DOCUMENTS

| | | | |
|---|---|---|---|
| 3,488,221 | 1/1970 | Shimotake et al. | 429/103 |
| 3,876,474 | 4/1975 | Watts et al. | 75/147 |
| 3,957,532 | 5/1976 | Settle et al. | 75/138 |
| 3,966,490 | 6/1976 | Auborn | 429/218 |
| 4,002,492 | 1/1977 | Rao | 429/218 |
| 4,011,372 | 3/1977 | Tomczuk | 429/218 |

*Primary Examiner*—Benjamin R. Padgett
*Assistant Examiner*—Irwin Gluck
*Attorney, Agent, or Firm*—Dean E. Carlson; Frank H. Jackson; Hugh W. Glenn

[57] ABSTRACT

A negative electrode composition is presented for use in a secondary, high-temperature electrochemical cell. The cell also includes a molten salt electrolyte of alkali metal halides or alkaline earth metal halides and a positive electrode including a chalcogen or a metal chalcogenide as the active electrode material. The negative electrode composition includes up to 50 atom percent lithium as the active electrode constituent and a magnesium-aluminum alloy as a structural matrix. Various binary and ternary intermetallic phases of lithium, magnesium, and aluminum are formed but the electrode composition in both its charged and discharged state remains substantially free of the alpha lithium-aluminum phase and exhibits good structural integrity.

8 Claims, 5 Drawing Figures

LEGEND:
(For Figs. 1a thru 1d)

FCC = FACE CENTERED CUBIC
HCP = HEXAGONAL CLOSE PACKING
L = LIQUID

LITHIUM-ALUMINUM-MAGNESIUM ELECTRODE COMPOSITION

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to high-temperature electrochemical cells that employ molten-salt electrolytes. More particularly it concerns a negative electrode composition which exhibits improved structural integrity on cycling.

A large amount of work has been done in the development of high-temperature electrochemical cells. Positive electrodes for use in such cells have included chalcogens such as sulfur, oxygen, selenium or tellurium as well as their transition metal chalcogenides. Positive electrode materials such as the sulfides of iron, cobalt, nickel and copper are commonly employed.

In high-temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal.

Alkali metals such as lithium, sodium, potassium and alloys of these materials are contemplated as negative electrode reactants. Other cells have included the alkaline earth metals such as calcium, magnesium, etc. in negative electrodes. Alloys of these materials such as lithium-aluminum, lithium-silicon, lithium-magnesium, calcium-magnesium, calcium-aluminum, calcium-silicon, magnesium-aluminum have been investigated to maintain the negative electrode in solid form rather than as molten metal at the cell operating temperatures.

In prior lithium-aluminum electrodes the loss of lithium on electrical discharge has resulted in near complete degradation of the electrode structure. Aluminum without alloy additives appears unable to maintain a coherent electrode structure during electrochemical cycling. It crystallizes in patches and particles such that the original electrode form is lost.

PRIOR ART STATEMENT

The following patents are related to the subject matter but do not teach or suggest the present invention:

Tomczuk et al., U.S. Pat. No. 4,011,372, Mar. 8, 1977, "Method of Preparing a Negative Electrode Including Lithium Alloy for Use within a Secondary Electrochemical Cell". This patent discloses a particular method of electrode preparation and suggests the use of lithium-aluminum, lithium-magnesium and lithium-silicon alloys. The reference, however, does not disclose or teach the use of particular lithium-aluminum-magnesium compositions which retain a coherent electrode structure during cycling.

Walsh et al., U.S. Pat. No. 3,992,222, Nov. 16, 1976, "Metallic Sulfide Additives for Positive Electrode Material within a Secondary Electrochemical Cell". Various combinations of metal sulfides are suggested for use in the positive electrode of high-temperature electrochemical cells. Binary and ternary alloys of lithium-aluminum and lithium-magnesium are suggested as a negative electrode material. However, the particular negative electrode composition claimed in this application is not suggested nor is the improved structural integrity obtained by the incorporation of minor portions of magnesium into a lithium-aluminum electrode composition disclosed.

Settle et al., U.S. Pat. No. 3,957,532, May 18, 1976, "Method of Preparng an Electrode Material of Lithium-Aluminum Alloy". This patent discloses the various phases and compositions of lithium-aluminum alloys that are appropriate for use as a negative electrode material. A lithium-aluminum phase diagram shows the alpha phase as present between about 0 to 45 atom % lithium in aluminum. The patent does not disclose ternary alloys of lithium-aluminum and magnesium that exhibit little alpha lithium-aluminum formation and also provide an unexpected improvement in structural integrity during electrochemical cycling.

Buzzelli, U.S. Pat. No. 3,607,413, Sept. 21, 1971, "Method for Electrochemical Alloying of Aluminum and Lithium". This patent suggests that negative electrodes of lithium-aluminum alloys may have less than 10 weight percent impurities of, for example, copper, magnesium, manganese, indium and iron. However, there is no teaching of an alloy including the addition of sufficient magnesium into lithium-aluminum to prevent electrode structure degradation.

SUMMARY OF THE INVENTION

Therefore, in view of the disadvantages of prior art systems, it is an object of the present invention to provide a negative electrode composition of improved structural integrity to that exhibited by lithium-aluminum alloys.

It is also an object to provide a negative electrode composition including lithium which remains in solid form and provides improved efficiency in lithium extraction during cycling.

It is another object to provide a ternary lithium-aluminum electrode composition that is substantially free of the alpha lithium-aluminum phase during cell cycling.

It is a further object of the invention to provide a method of preparing a negative electrode composition of lithium-aluminum and magnesium.

In accordance with the present invention, a negative electrode composition for use in a secondary, high-temperature electrochemical cell is presented. The cell includes a molten-salt electrolyte containing alkali metal halides or alkaline earth metal halides and a positive electrode includng chalcogens or transition metal chalcogenides. The negative electrode composition comprises about 5 to 50 atom percent lithium and about 95 to 50 atom percent alloy of aluminum and magnesium. The aluminum-magnesium alloy includes about 5 to 20 atom percent magnesium.

In more specific aspects of the invention, the electrode composition is substantially free of the alpha lithium-aluminum phase. The composition contains at least one of the intermetallic phases including $Li_2Al_xMg_y$, where the sum of x and y is about 2, and $LiMgAl_2$. Binary compounds including beta lithium-aluminum and magnesium-aluminum are also formed at various concentrations of lithium and aluminum.

The invention also involves a method of preparing an improved negative electrode composition. The method comprises forming an alloy of magnesium and aluminum containing 5 to 20 atom percent magnesium and electrochemically depositing 5 to 50 atom percent lithium into the magnesium-aluminum alloy. The substrate of magnesium and aluminum is preferably formed as a porous mass. This can be accomplished by compacting or sintering wires, fibers or other particles of the alloy to form the porous mass.

DETAILED DESCRIPTION OF THE PREFERRED EMBODIMENT

Figure 1A:
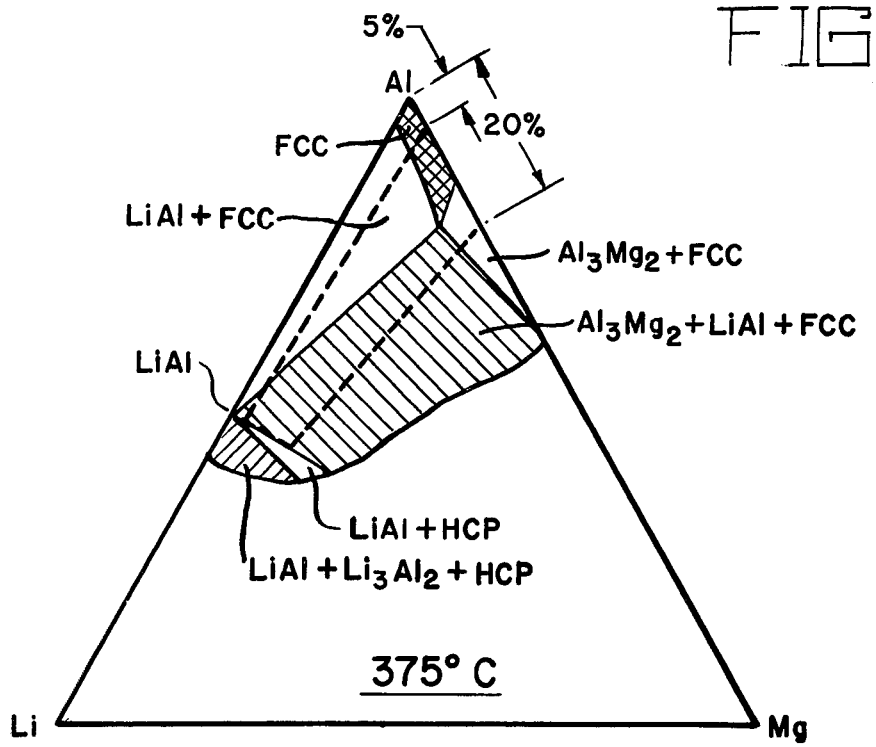
FIGS. 1a, 1b, 1c and 1d are calculated isothermal phase diagrams of the system lithium-magnesium-aluminum at 375° C, 400° C, 450° C and 500° C, respectively.

The improved electrode composition of the present invention is one of lithium and aluminum having sufficient quantities of magnesium to maintain structural integrity in the discharged state. The present inventors have found that the addition of 5 to 20 atom percent magnesium into the aluminum prior to alloying with lithium greatly improves the structural integrity of the electrode throughout the electrochemical cycling period.

An alloy composition of about 5 atom percent magnesium to 20 atom percent magnesium and aluminum is prepared by conventional techniques. It is expected that at least 5 atom percent magnesium is necessary to maintain structural integrity during electrical discharge when the lithium atoms migrate to the electrolyte. Since the magnesium does not enter into the cell reaction, it appears to serve in interstitial or substitutional solid solution as a bonding material for maintaining a matrix structure into which the lithium can be repeatedly charged. Magnesium concentrations much in excess of 20 atom percent increase the risk of liquid-phase formation with the electrode constituents at cell-operating temperatures of e.g. about 350°-500° C.

Lithium is added to the aluminum-magnesium alloy in proportions comparable to those in lithium-aluminum electrodes. In general, the ternary system of lithium, aluminum and magnesium at the higher lithium and magnesium levels appears to have a somewhat lower liquidus temperature than lithium-aluminum alloy. With magnesium concentrations between 5 and 20 atom percent in aluminum, lithium concentrations of 5 to 50 atom percent are contemplated. Even at these concentration ranges liquid and solid phases may be formed at the higher cell-operating temperatures.

In one manner of preparing the alloy material, the negative electrode material of the present invention a magnesium-aluminum alloy is first formed. Powders in the desired proportion of the constituents can be melted together for casting into the desired configuration. Other metallurgical techniques also can be employed including extrusion and powder metallurgical methods.

The initial alloy of magnesium and aluminum is advantageously formed into a porous substrate. This can be accomplished by compacting or sintering particles, wires, fibers or other forms of the constituent materials. Extruded wires or elongated particles of the magnesium-aluminum alloy can be entangled into a porous mass. In another method, the cast alloy or constituents of the cast alloy can be comminuted to particles pressed and sintered to form a porous substrate of magnesium-aluminum alloy in the desired constituent proportions.

Lithium is preferably added to the magnesium-aluminum alloy electrochemically. This can be performed as the initial charge within an assembled cell having sufficient reaction product, e.g. a lithium chalcogenide, to provide lithium into the negative electrode composition. However, in order to control electrode quality, at least an initial portion of the lithium can be electrochemically deposited in a separate formation cell. A cell containing lithium metal as one electrode, molten salt electrolyte and positive electrodes of porous magnesium-aluminum alloy can be spontaneously discharged to deposit the lithium into the magnesium-aluminum alloy. Such formation cells can be operated during a number of cycles to obtain a uniform distribution of lithium throughout the lithium-aluminum-magnesium alloy.

Various other methods may also be employed in preparing and using the lithium-magnesium-aluminum electrode material. For example, a melt of this alloy may be prepared and cast, extruded or otherwise fabricated into the desired shape. Particles of the lithium-magnesium alloy can be formed and loaded into a porous electrically conductive substrate. In addition, a melt of the preferred electrode material composition can be prepared and a substrate of an electrically conductive metal of high melting point such as foamed stainless steel or nickel can be submerged within the melt, removed and cooled to solidify the alloy as is taught in Tonczuk et al. cited above.

FIGS. 1a, 1b, 1c and 1d show the lithium-magnesium-aluminum system in atom percentages at isothermals of 375°, 400°, 450° and 500° C. These ternary diagrams were prepared by Marie-Louise Saboungi and Chen C. Hsu using calculations and data of the three binary systems involved. Consequently, none of the ternary intermetallic phases found by the present inventors are illustrated. The phases $Li_2Al_xMg_y$ and $LiMgAl_2$ appear as indicated in Table I below and may involve a portion of the magnesium otherise present in the regions illustrated as containing FCC. The calculated diagrams were presented at the "Workshop on Application of Phase Diagrams and Metallurgy and Ceramics", NBS, Gaithersburg, Maryland, Jan. 10–12, 1977; *CALPHAD*, Volume I, No. 3, pages 237–251, Pergamon Press 1977, printed in Great Britain.

These isothermal sections of the lithium-aluminum-magnesium ternary system are altered to show the alloy range of the present invention. The alloy compositions defined between 5 and 20 atom percent magnesium and up to 50 atom percent lithium are outlined in dashed lines on each of FIG. 1 diagrams. FIG. 1a shows that only solid phases are present at 375 Ⓡ C. within these compositional limits. Cell operating temperatures below 375° C. likewise would permit solid phases of the constituents. However, temperatures of 300° C. and above are required in most electrochemical cells that employ the usual molten salt electrolytes. Also at these lower temperatures alloy compositions having increased amounts of magnesium and lithium beyond the claimed compositional limits may be suitable. As will be seen presently, high concentrations of lithium or magnesium at somewhat elevated temperatures incur a risk of liquid phase formation.

The appearance of small amounts of liquid phase in the negative electrode will not necesarily render the cell inoperative. Prior electrochemical cells have employed molten lithium and other alkali metals as negative electrode materials. In the present electrode composition molten phase if appreciable would tend to accumulate at the lower electrode surfaces preventing an even distribution of active material. Small amounts of liquid, however, may be trapped or entrained within the solid electrode structure or merely act to wet surfaces of a porous electrode solid. With these considerations in mind it is to be understood that the compositional limits of the present invention have been selected to restrict but not necessarily preclude liquid phase formation within the negative electrode.

Figure 1B:
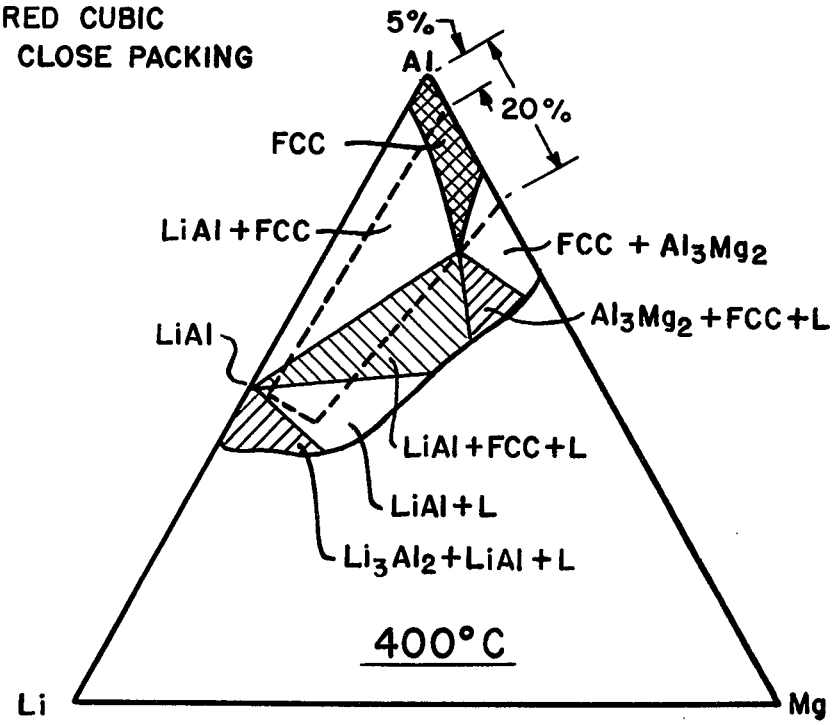
Figure 1C:
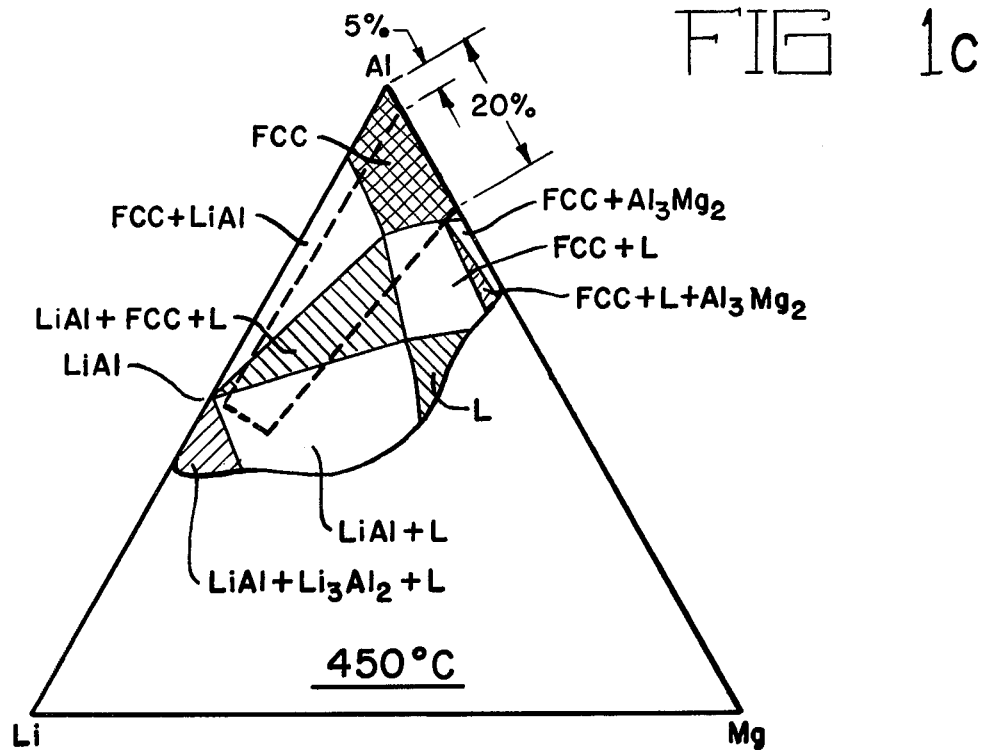
Figure 1D:
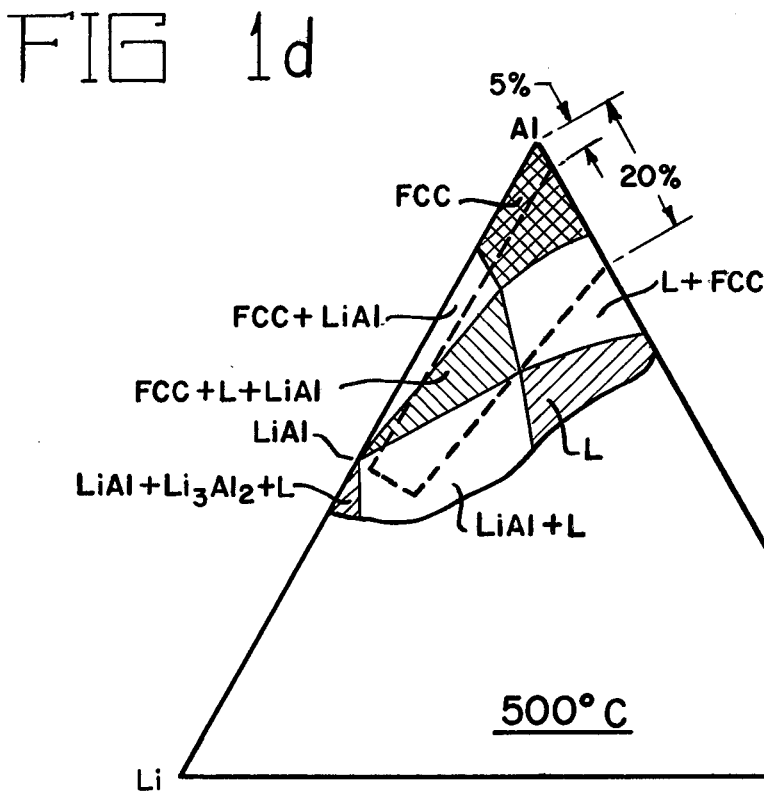

FIGS. 1b, 1c and 1d illustrate the ternary system at the 400°, 450° and 500° C. isotherms. This system includes liquid (L), face centered cubic (FCC), body centered cubic (BCC) and hexagonal close packing (HCP) phases. It is seen that an increasing area of the compositional system appears in liquid phase or liquid and solid phases as the temperature is increased. Even at the defined compositional ranges some liquid appears with the solid phases of the electrode. It is expected that insufficient solid material will remain to maintain an integral electrode structure during cycling at temperatures much above 500° C. at high lithium concentrations. Negative electrodes operated in this manner with substantial amounts of liquid active material will need containment structures such as porous and wettable, solid substrates or containment reservoirs.

Figure 2:
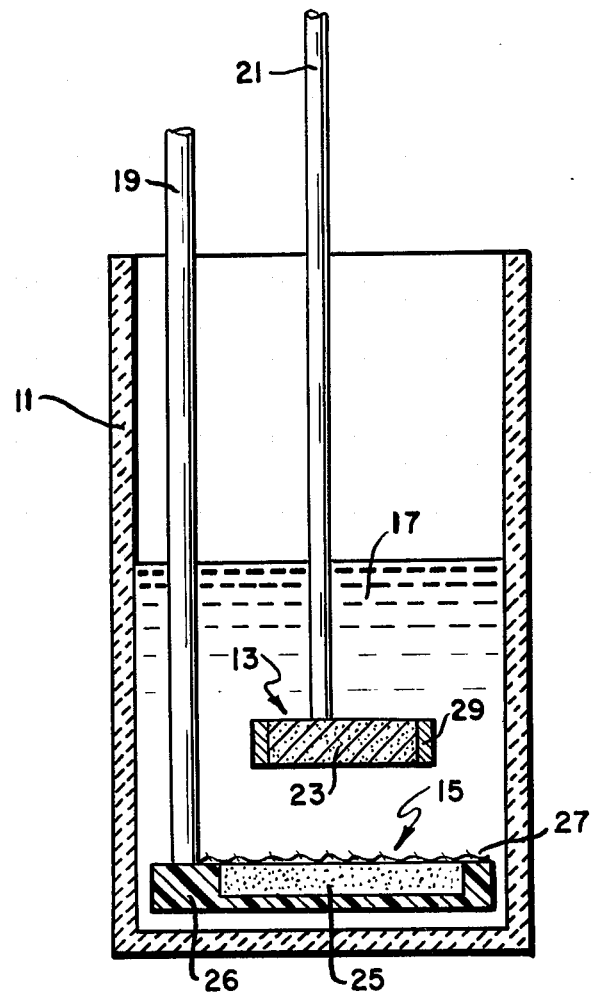
FIG. 2 is a schematic illustration of an electrochemical cell that can be used in the testing of the electrode composition of the present invention.

FIG. 2 shows a schematic of an electrochemical cell that is suitable for testing the present electrode. In practice various cell designs may be used with the electrode composition and method of the present invention.

The electrochemical cell is shown contained within a ceramic crucible 11. The cell includes a negative electrode 13 and a positive electrode 15 both of which are submerged within a molten electrolytic salt 17. Electrode conductors 19 and 21 extend from the positive and negative electrodes respectively for connection to the electrical instrumentation for evaluating the cell.

The positive electrode 15 is illustrated as a covered structure with central chamber for containing the cathode reactant composition 25, e.g. a transition metal chalcogenide. The structure is illustrated as a graphite cup 26 covered with a wetted, porous carbon cloth 27 which permits permeation of the molten electrolyte.

Electrolyte 17 within the crucible can be a molten salt composition, for instance, LiCl-KCl or LiCl-LiF-KBr. Various other suitable electrolytes can be selected from those listed in U.S. Pat. No. 3,488,221.

Negative eletrode 13 is illustrated with a structural support ring 29 that can be used where electrode substrates of high porosity and low strength are employed. The active material 23 can be in the form of a porous compact or plaque including the lithium-aluminum-magnesium composition prepared by the above described methods. Coiled wires, coated substrates and various other forms of this novel electrode material can be adapted for use in this application.

The following examples are presented to illustrate specific embodiments of the present invention and to demonstrate one manner of its operation.

EXAMPLE I

A negative electrode is formed by preparing a compact of entangled wires of extruded aluminum-magnesium metal. About 10 atom percent magnesium is included into the aluminum. Lithium metal of a formation cell is electrochemically deposited into the compact in a series of three formation cycles. The completed negative electrode includes 45 atom percent lithium. This compact containing electrodeposited lithium is assembled in an electrochemical cell similar to that shown in FIG. 2 opposite to a positive electrode containing FeS as active material.

EXAMPLE II

In order to illustrate the structural integrity of the electrode material of the present invention, a number of wires containing aluminum and aluminum-magnesium alloy were prepared and cycled opposite conventional lithium-aluminum electrodes by means of outside sources of electric current. The cells were operated at temperatures of 450° C. Wires of about 0.13 cm diameter were used initially but with lithium additions the wires expanded to diameters of about 0.17 to 0.20 cm. Other characteristics and results of the tests are given below in Table I.

TABLE I

| At % Mg in Al | At % Li | Cycles | mA cm$^2$ | Ave % Li Cycled | Phases observed |
|---|---|---|---|---|---|
| 0 | | 3 | 107 | 75 | α LiAl |
| 0 | | 1 | 28 | 80 | β LiAl |
| 5 | | 1 | 41 | 93 | |
| 10 | 42 | 1 | 35 | 92 | β LiAl |
| 10 | 42 | 2 | 26 | 96 | LiMgAl$_2$ |
| 10 | 46 | 1 | 35 | 91 | 6-8 at. % Mg in Al |
| 10 | 25 | 1 | 18 | | |
| 10 | 40 | 1 | 22 | | |
| 15 | 49 | 3 | 27 | 90 | β LiAl |
| 19 | 46 | 1 | 16 | 81 | LiMgAl$_2$ |
| 19 | 46 | 3 | 20 | 72 | 16 at. % Mg in Al |
| 20 | | 1 | 44 | 65 | Li$_2$Al$_x$Mg$_y$ (20 at. % only) |

In none of the tests that included magnesium were appreciable amounts of alpha lithium-aluminum detected. In two of the cells having 10 at. % magnesium, trace amounts, e.g. less than 5 atom percent, of aluminum possibly from alpha lithium-aluminum were noted but not at sufficiently high concentrations to impair the structural integrity of the electrode.

In the two cells employing only lithium aluminum alloy, the wires after discharge disintegrated into particles and islands of alpha lithium-aluminum metal. This is in sharp contrast to each of the samples having in excess of 5 at. % magnesium in the original aluminum-magnesium-alloy. In each of these latter cells, an integral porous structure of aluminum-magnesium remained after discharge. This porous structure was suitable for recharging with additional lithium on subsequent cycles.

In the electrodes having 19 and 20 atom percent magnesium the discharged alloy composition included a phase of magnesium aluminum that appeared to include no more than 16 at. % magnesium by X-ray diffraction. Additional magnesium remained in LiMgAl$_2$ or possibly in other phases In the 20 at. % cell, Li$_2$Al$_x$Mg$_y$, where the sum of x and y is about 2, was noticed. No alpha LiAl was detected.

In the test cells including 10 at. % magnesium in the original magnesium-aluminum alloy the phases of beta lithium-aluminum, LiMgAl$_2$ and magnesium dissolved in aluminum at concentrations of about 6 to 8 atom percent were noted. No substantial amount of alpha LiAl was detected. Also the test cells including magnesium additions, particularly at the 10 at. % magnesium level exhibit substantially increased efficiency in lithium extraction over that of the lithium-aluminum negative electrodes.

It is to be understood that even in the ordinary lithium-aluminum negative electrodes small amounts, normally less than 5 atom percent of magnesium as an impurity may be present. The alloy compositions of the present invention include magnesium levels added in addition to those impurity amounts which cannot be relied on to effect the advantages attributed to the novel alloy composition of the present invention. It also will be understood that although the present invention has been described in terms of particular embodiments, variations in materials and processing steps known to those skilled in the art can be made in accordance with the invention.

The embodiments of the invention in which an exclusive property or privilege is claimed are defined as follows:

1. A solid electrode composition for use in the negative electrode of a high-temperature, secondary electrochemical cell having molten salt electrolyte including alkali metal halides or alkaline earth metal halides and in a positive electrode including a chalcogen or a transition metal chalcogenide, said solid electrode composition comprising about 5 to 50 atom percent lithium and about 95 to 50 atom percent alloy of aluminum and magnesium, said aluminum-magnesium alloy comprising about 5 to 20 atom percent magnesium.

2. The electrode composition of claim 1 wherein said composition is substantially free of the alpha lithium-aluminum alloy phase.

3. The negative electrode composition of claim 1 wherein said aluminum-magnesium alloy consists essentially of aluminum and magnesium.

4. The negative electrode composition of claim 1 wherein said composition includes at least one of the intermetallic phases $LiMgAl_2$ and $Li_2Mg_xAl_y$ where the sum of x and y is about 2, but the composition is substantially free of the alpha phase of lithium-aluminum alloy.

5. The negative electrode composition of claim 1 wherein said composition includes magnesium-aluminum alloy phase, an intermetallic phase of $LiMgAl_2$ and beta lithium-aluminum alloy phase, but is substantially free of the alpha phase of lithium-aluminum alloy.

6. A method of preparing a negative electrode composition for use in a high-temperature, secondary electrochemical cell having molten-salt electrolyte including alkali metal halides or alkaline earth metal halides and a positive electrode including chalcogens or transition metal chalcogenides, said method comprising forming an alloy of magnesium-aluminum having about 5 to 20 atom percent magnesium; and electrochemically depositing about 5 to 50 atom percent lithium into the magnesium-aluminum alloy.

7. The method of claim 6 wherein said magnesium-aluminum alloy is formed into a porous mass prior to electrodepositing lithium therein.

8. The method of claim 6 wherein said magnesium-aluminum alloy is formed by extrusion of melt into wire form and compaction into a porous compact of magnesium-aluminum.

* * * * *